United States Patent
Hay et al.

(10) Patent No.: US 12,145,625 B2
(45) Date of Patent: Nov. 19, 2024

(54) SYSTEM AND METHOD FOR DETECTION AND REPORTING OF DATA SIGNAL INTERFERENCE THROUGH VEHICLE CROWD SOURCING

(71) Applicant: GM GLOBAL TECHNOLOGY OPERATIONS LLC, Detroit, MI (US)

(72) Inventors: Curtis L. Hay, Washington Township, MI (US); Iqbal M. Surti, Troy, MI (US); Pei Xu, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 17/826,241

(22) Filed: May 27, 2022

(65) Prior Publication Data

US 2023/0382424 A1    Nov. 30, 2023

(51) Int. Cl.
*B60W 60/00*        (2020.01)
*G01S 19/40*        (2010.01)

(52) U.S. Cl.
CPC ......... *B60W 60/0016* (2020.02); *G01S 19/40* (2013.01); *B60W 2420/408* (2024.01); *B60W 2554/4041* (2020.02); *B60W 2554/4049* (2020.02)

(58) Field of Classification Search
CPC ..... B60W 60/0016; B60W 2554/4041; B60W 2554/4049; B60W 2420/408; G01S 19/40
USPC .......................................................... 701/23
See application file for complete search history.

(56) References Cited

U.S. PATENT DOCUMENTS

| | | | | |
|---|---|---|---|---|
| 9,366,764 | B2 * | 6/2016 | Sun .......................... | G01S 19/49 |
| 9,743,373 | B2 * | 8/2017 | Rudow .................... | G01S 19/09 |
| 2015/0153175 | A1 * | 6/2015 | Skaaksrud ......... | G08B 21/0261 701/23 |
| 2019/0138003 | A1 * | 5/2019 | Ming .................... | G05D 1/0061 |
| 2019/0364492 | A1 * | 11/2019 | Azizi ................ | H04W 52/0261 |
| 2020/0233094 | A1 * | 7/2020 | Kumar ................. | G05D 1/0278 |
| 2022/0348217 | A1 * | 11/2022 | Jeong ..................... | B60W 50/14 |
| 2022/0388505 | A1 * | 12/2022 | Sharma Banjade ......... | G08G 1/096783 |
| 2023/0254033 | A1 * | 8/2023 | Good ................. | H04B 7/18513 455/427 |
| 2023/0360406 | A1 * | 11/2023 | Yu .............................. | G06T 7/73 |
| 2023/0422011 | A1 * | 12/2023 | Fernandez Guzman ..... | A01B 69/008 |

* cited by examiner

*Primary Examiner* — Yazan A Soofi
(74) *Attorney, Agent, or Firm* — Quinn IP Law

(57) ABSTRACT

A system for detection and reporting of data signal interference includes a plurality of vehicles. Each vehicle includes a global navigation satellite system (GNSS) receiver receiving a GNSS signal, a cellular modem configured for sending and receiving data over a wireless communication network, and a computerized detection and reporting controller. The controller includes programming to monitor the GNSS signal, analyze the GNSS signal to identify a presence of radio frequency (RF) interference, and generate a report of an RF interference event to a remote server device based upon the presence of the interference. The system further includes the server device including programming to monitor the report of the interference event from each of the vehicles, identify a threshold RF interference event based upon the report of the RF interference event from each of the plurality of vehicles, and command a remedial action based upon the threshold RF interference event.

19 Claims, 6 Drawing Sheets

SYSTEM AND METHOD FOR DETECTION AND REPORTING OF DATA SIGNAL INTERFERENCE THROUGH VEHICLE CROWD SOURCING

INTRODUCTION

The disclosure generally relates to a system and method for detection and reporting of data signal interference through vehicle crowd sourcing.

A communication network may provide for information transfer both through wired connections and through wireless communications. One method of providing wireless communications is by communicating a data signal from a satellite to a receiver on the ground surface. A vehicle may use such a data signal to enable vehicle systems, such as an autonomous vehicle navigation system.

SUMMARY

A system for detection and reporting of data signal interference through vehicle crowd sourcing is provided. The system includes a plurality of vehicles. Each vehicle includes a global navigation satellite system (GNSS) antenna and a GNSS receiver electronically connected to and receiving a GNSS data signal though the GNSS antenna. Each vehicle further includes a cellular antenna and a cellular modem configured for sending and receiving data over a wireless communication network through the cellular antenna. Each vehicle further includes a computerized detection and reporting controller. The controller includes programming to monitor the GNSS data signal, analyze the GNSS data signal to identify a presence of radio frequency (RF) interference, and generate a report of an RF interference event over the wireless communication network to a remote server device based upon the presence of the RF interference. The system further includes the remote server device. The remote server device includes programming to monitor the report of the RF interference event from each of the plurality of vehicles, identify a threshold RF interference event based upon the report of the RF interference event from each of the plurality of vehicles, and command a remedial action based upon the threshold RF interference event.

In some embodiments, the remote server device further includes programming to analyze the report of the RF interference event from each of the plurality of vehicles and determine the RF interference event to be an intentional act based upon the analyzing. The remedial action includes notifying authorities of the intentional act.

In some embodiments, the programming to analyze the report of the RF interference event from each of the plurality of vehicles includes comparing a noise reference level and a conformity index with a satellite carrier-to-noise ratio, an estimated position error, pseudorange residuals, and Doppler uncertainties.

In some embodiments, comparing the noise reference level and the conformity index with the satellite carrier-to-noise ratio, the estimated position error, the pseudorange residuals, and the Doppler uncertainties includes determining occurrence of at least one of an immediate reduction in satellite carrier-to-noise ratio levels by at least 5 dB, the estimated position error exceeds 75 meters, an immediate increase in pseudorange residuals by at least 20 meters, or an immediate increase in Doppler uncertainties by at least 10%.

In some embodiments, the remedial action includes providing a message to an occupant in at least one of the plurality of vehicles.

In some embodiments, the message includes notifying the occupant of the RF interference and advising the occupant to take manual control.

In some embodiments, the remedial action includes generating a command for one of the plurality of vehicles to pull over and stop.

In some embodiments, the remedial action includes generating a command in at least one of the plurality of vehicles to adjust a navigational route to avoid effects of the RF interference event.

In some embodiments, the remedial action includes generating a map display illustrating a location of the RF interference event.

According to one alternative embodiment, a method for detection and reporting of data signal interference through vehicle crowd sourcing is provided. The method includes within each of a plurality of vehicles receiving a GNSS data signal though a GNSS antenna. The method further includes, within a computerized processor, monitoring the GNSS data signal, analyzing the GNSS data signal to identify a presence of radio frequency (RF) interference, and generating a report of an RF interference event over a wireless communication network to a remote server device based upon the presence of the RF interference. The method further includes, within the remote server device, monitoring the report of the RF interference event from each of the plurality of vehicles, identifying a threshold RF interference event based upon the report of the RF interference event from each of the plurality of vehicles, and commanding a remedial action based upon the threshold RF interference event.

In some embodiments, the method further includes, within the remote server device, analyzing the report of the RF interference event from each of the plurality of vehicles, and determining the RF interference event to be an intentional act based upon the analyzing. Commanding the remedial action includes notifying authorities of the intentional act.

In some embodiments, analyzing the report of the RF interference event from each of the plurality of vehicles includes comparing a noise reference level and a conformity index with a satellite carrier-to-noise ratio, an estimated position error, pseudorange residuals, and Doppler uncertainties.

In some embodiments, comparing the noise reference level and the conformity index with the satellite carrier-to-noise ratio, the estimated position error, the pseudorange residuals, and the Doppler uncertainties includes determining occurrence of at least one of an immediate reduction in satellite carrier-to-noise ratio levels by at least 5 dB, the estimated position error exceeds 75 meters, an immediate increase in pseudorange residuals by at least 20 meters, or an immediate increase in Doppler uncertainties by at least 10%.

In some embodiments, commanding the remedial action includes providing a message to an occupant in at least one of the plurality of vehicles.

In some embodiments, the message includes notifying the occupant of the RF interference and advising the occupant to take manual control.

In some embodiments, commanding the remedial action includes commanding one of the plurality of vehicles to pull over and stop.

In some embodiments, commanding the remedial action includes generating a command in at least one of the plurality of vehicles to adjust a navigational route to avoid effects of the RF interference event.

In some embodiments, commanding the remedial action includes generating a map display illustrating a location of the RF interference event.

According to one alternative embodiment, a system for detection and reporting of data signal interference through vehicle crowd sourcing is provided. The system includes a plurality of vehicles. Each vehicle includes a global navigation satellite system (GNSS) antenna and a GNSS receiver electronically connected to and receiving a GNSS data signal though the GNSS antenna. Each vehicle further includes a cellular antenna and a cellular modem configured for sending and receiving data over a wireless communication network through the cellular antenna. Each vehicle further includes a computerized detection and reporting controller including programming to monitor the GNSS data signal, analyze the GNSS data signal to identify a presence of radio frequency (RF) interference, and generate a report of an RF interference event over the wireless communication network to a remote server device based upon the presence of the RF interference. The system further includes the remote server device including programming to monitor the report of the RF interference event from each of the plurality of vehicles and identify a threshold RF interference event based upon the report of the RF interference event from each of the plurality of vehicles. The remote server device further includes programming to analyze the report of the RF interference event from each of the plurality of vehicles, determine the RF interference event to be an intentional act based upon the analyzing, and command a remedial action based upon the threshold RF interference event. The remedial action includes notifying authorities of the intentional act. The programming to analyze the report of the RF interference event from each of the plurality of vehicles includes one of comparing a noise reference level and a conformity index with a carrier-to-noise ratio, an estimated position error, pseudorange residuals, or Doppler uncertainties.

The above features and advantages and other features and advantages of the present disclosure are readily apparent from the following detailed description of the best modes for carrying out the disclosure when taken in connection with the accompanying drawings.

DETAILED DESCRIPTION

Figure 1:
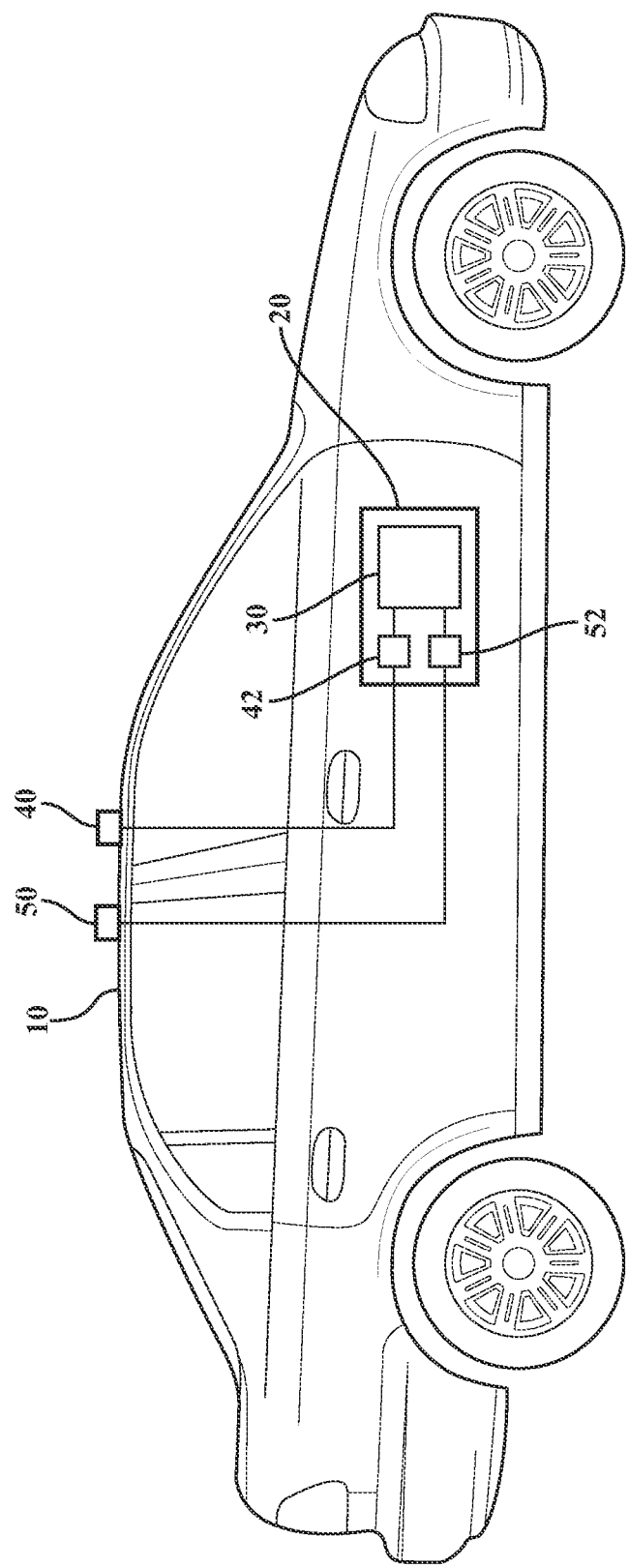
FIG. 1 schematically illustrates an exemplary vehicle including a system for detection and reporting of data signal interference, in accordance with the present disclosure.

Vehicles may use a Global Navigation Satellite System (GNSS) signal to compute location. Knowledge of vehicle latitude, longitude, heading, speed, time and elevation is useful for automotive features such as navigation, emergency response, roadside assistance, or automated active driver-assist. GNSS signals are vulnerable to radio frequency (RF) interference. This interference can occur either intentionally or unintentionally. When strong RF interference is present near the vehicle, its embedded GNSS receiver will not operate correctly. The computed location may be incorrect by tens or hundreds of meters. In other cases, RF interference may prevent the receiver from computing location at all.

A disclosed system and method provide advanced signal processing techniques that may be used to detect the presence of RF interference to GNSS. Additionally, when these interfering sources are detected, their locations can be broadcast via vehicle telemetry to a central repository.

GNSS interference may be detected by analyzing unique parameters within the GNSS receiver such as active gain control (AGC), satellite signal levels, pseudorange residuals, Doppler uncertainties, estimated position error, and constellation geometry. The disclosed system and method combine parameters reported by the GNSS chipset manufacturer at 1-Hz with additional information available more frequently to give vehicle operators excellent confidence by identifying harmful interference.

The disclosed system and method may detect different types or classes of RF interference, including jamming (unwanted noise in GNSS spectrum) and spoofing (intentional broadcast of signals that resemble GNSS). The magnitude of jamming/spoofing events are stored as variables—8 bits for jamming, and a floating-point value between 0.0 and 1.0 for spoofing.

The disclosed method and system may utilize crowd sourcing to collect jamming/spoofing reports from a plurality of reporting vehicles to provide additional data of RF interference collected over time. Collected information may be automatically sent to a data center operating a remote server device as part of routine vehicle telemetry. GNSS interference data or RF interference data may be made available to third parties (e.g., regulatory agencies, law enforcement, departments of transportation).

Under exemplary operation of the disclosed system and method, a process to identify intentionally created RF interference is provided. A host vehicle acting as a reporting vehicle may collect the following observations in real-time from GNSS receiver at the provided exemplary sampling frequencies: noise reference level (1 Hz), conformity index (1 Hz), carrier-to-noise ratio (C/NO) (10-Hz), estimated position error (10-Hz), pseudorange residuals (10-Hz), and Doppler uncertainties (10-Hz). In one exemplary comparison, the system and method may compare the noise reference level and the conformity index in real-time with the carrier-to-noise ratio, the estimated position error, the pseudorange residuals, and the Doppler uncertainties. Jamming and/or spoofing are more likely the be occurring when the following conditions are observed: immediate reductions in satellite C/NO levels by ~5 dB or more, when estimated position error exceeds ~75 meters, an immediate increase in pseudorange residuals by >~20 meters, and/or an immediate increase in Doppler uncertainties by >10%. When one or more of these conditions occur, an RF interference event may be determined or estimated to be intentionally created. Further, when the cited parameters indicate likely jamming or spoofing, the system may assign an 8-bit value to "jamming severity" and a float value between 0.0 and 1.0 to "spoofing likelihood". High values for "jamming severity" and "spoofing likelihood" parameters may be checked against other reports from neighboring vehicles. When similarly high values of RF interference are concentrated within a discrete location, this region is flagged as being impacted by GNSS signal interference or RF interference. Such a location experiencing interference may be reported by the system or a system operator to officials interested in keeping GNSS spectrum free from RF interference. Exemplary officials may include the U.S. Federal Communications Commission, the U.S. Department of Transportation, the National Telecommunications and Information Administration, the Federal Bureau of Investigation, etc. In one embodiment, a remote server device receiving reports from vehicles of RF interference may create a real-time interference map that may be utilized to improve monitoring of RF interference.

Referring now to the drawings, wherein like reference numbers refer to like features throughout the several views, FIG. 1 schematically illustrates exemplary vehicle 10 including a system 20 for detection and reporting of data signal interference. The system 20 includes a computerized detection and reporting controller 30, a GNSS receiver 42, and a cellular modem 52. The GNSS receiver 42 is in communication with and is configured for receiving data signals through a vehicle GNSS antenna 40. Remote devices embodied as satellites in orbit may provide data signals that are useful to the vehicle 10, for example, providing location data of the vehicle 10, data signals such as audio entertainment data streams, and other similar information. Data signals provided by satellite are inherently relatively weak signals. RF interference may inadvertently or intentionally interfere with the vehicle GNSS antenna 40 accurately receiving signals provided by a satellite.

The cellular modem 52 is in communication with and is configured for receiving and sending data through a vehicle cellular antenna 50. The vehicle cellular antenna 50 is configured for wireless communication with a remote cellular tower. Reports detailing data signal interference monitored and analyzed by the system 20 may be reported to a remote server or device through wireless communications enabled by the vehicle cellular antenna 50.

The computerized detection and reporting controller 30 includes one or more computerized devices operating programming configured for monitoring signals received through the GNSS receiver 42, analyzing those signals, diagnosing RF interference apparent through the analysis, and reporting the RF interference to a remote server device and/or an operator or occupant of the vehicle. In one embodiment, the RF interference may substantially impede operation of or may potentially mislead a navigational controller of the vehicle 10, for example, by preventing the navigational controller from determining an accurate location of the vehicle. Wherein the vehicle 10 is autonomous or semi-autonomous, the computerized detection and reporting controller 30 may include programming to diagnose loss of a reliable vehicle position and command the navigational controller to pull over the vehicle 10 to a side of the roadway, request instructions from an occupant of the vehicle 10, or request that the occupant take over manual control of the vehicle 10. Wherein the vehicle 10 is a manually operated vehicle, the computerized detection and reporting controller 30 may command deactivation of a map display within the vehicle 10, command that a disclaimer regarding unreliable position data be displayed upon the map display of the vehicle 10, and/or provide an audible and/or visual cue to the operator that RF interference has made vehicle position-based services of the vehicle 10 unreliable. In one embodiment, the computerized detection and reporting controller 30 may command use of a backup positioning system, for example, commanding use of cellular tower signal triangulation or use of visual cues detectable by vision or light detection and ranging (LIDAR) sensors in combination with a three-dimensional map database to confirm or provide a position of the vehicle. In one embodiment, historical or repeating occurrence of RF interference may be used to aid an operator or an automated navigational planning system to avoid a problematic area with repeated or reoccurring high RF interference.

Figure 2:
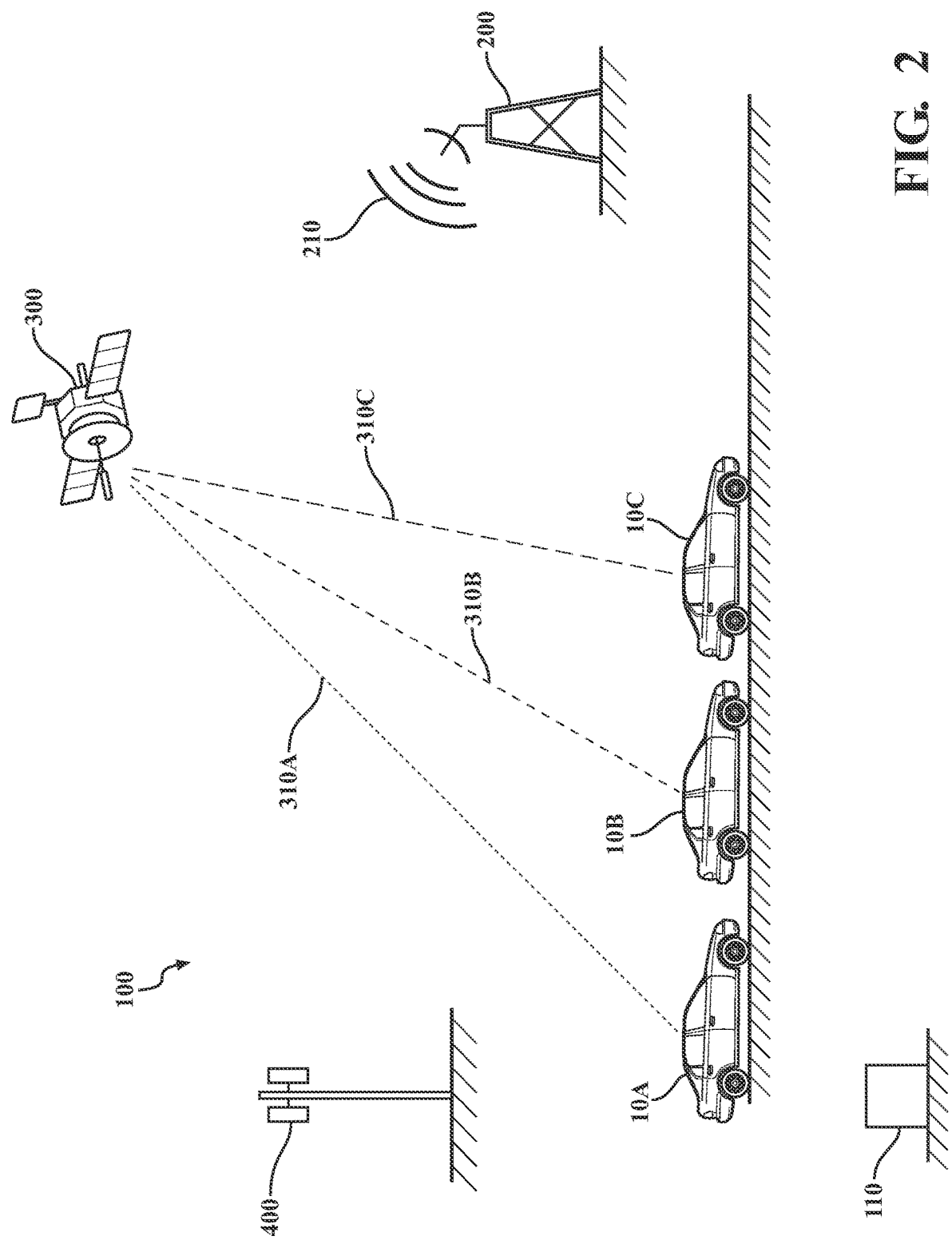
FIG. 2 schematically illustrates the computerized detection and reporting controller of FIG. 1 installed within a first vehicle, a second vehicle, and a third vehicle and operating as part of a system for detection and reporting of data signal interference through vehicle crowd sourcing, in accordance with the present disclosure.

The computerized detection and reporting controller 30 may operate locally to provide control and information outputs to vehicle 10 related to RF interference and an affect of that interference of the various systems of vehicle 10. FIG. 2 schematically illustrates the computerized detection and reporting controller 30 of FIG. 1 installed within a first vehicle 10A, a second vehicle 10B, and a third vehicle 10C and operating as part of a system 100 for detection and reporting of data signal interference through vehicle crowd sourcing. The system 100 is illustrated including the vehicles 10A, 10B, and 10C and a remote server device 110 in electronic wireless communication with each of the vehicles 10A, 10B, and 10C.

The vehicles 10A, 10B, and 10C are illustrated receiving data from a satellite 300 in orbit, with a data stream 310A being provided to vehicle 10A, a data stream 310B being provided to vehicle 10B, and a data stream 310C being provided to vehicle 10C. Although the vehicle 10A, 10B, and 10C are illustrated in proximity to each other for purposes of clear illustration, the vehicles 10A, 10B, and 10C may be in a line upon a roadway or may be distant from each other and in different states of travel. The vehicle 10A may be operating autonomously and traveling in a northerly direction upon a freeway in one region, vehicle 10B may be operating upon city streets in a second region, turning and stopping frequently in a second state, and vehicle 10C may be parked and in an off condition in a third region, with vehicle systems continuing to monitor data stream 310C.

An RF interference source 200 including an RF interference transmission 210 is additionally illustrated. The RF interference source 200 may include a wide variety of devices or installations, for example, including improperly calibrated infrastructure equipment, such as cellular towers or radio transmitters, and high voltage energy transmission lines. The RF interference source 200 may alternatively be a clandestine transmitter set up by a bad actor with nefarious intentions attempting to disrupt traffic or cause confusion. The illustrated data streams 310A, 310B, and 310C are illustrated with broken lines, with increased spacing between the line segments indicating a level of RF interference apparent in the respective signal. A number of factors may affect how much an RF interference transmission 210 affects a particular data signal. In the exemplary embodiment of FIG. 2, as the vehicles 10A, 10B, and 10C get physically closer to the RF interference source 200, the RF interference transmission 210 is illustrated having a greater and greater effect upon the data streams 310A, 310B and 310C.

Each of the vehicles 10A, 10B, and 10C, may operate methods disclosed herein to monitor and analyze a respective one of the data streams 310A, 310B, and 310C, and diagnose RF interference based upon the analysis. As each of the vehicles 10A, 10B, and 10C diagnose RF interference, they may each communicate with the remote server device 110 through wireless communications provided by a cellular tower 400. The remote server device 110 is a computerized device operating programming configured for making determinations based upon available RF interference data. The remote server device 110, monitoring communications from each the vehicles 10A, 10B, and 10C, may analyze, record, tabulate, or otherwise process the communications related to the RF interference. The remote server device 110 may operate programming to determine or estimate whether the RF interference is unintentionally or intentionally being generated. The remote server device 110, in response to unintentionally generated RF interference, may take action based upon the unintentionally generated RF interference, for example, providing commands to vehicles near or traveling to the area with the RF interference. Such commands may include warnings to vehicle occupants, instructions to avoid certain areas, and recommendations to the occupants to take manual control over the vehicles. Further, the remote server device 110 may contact or recommend contact with authorities or transmitter owners in order to resolve the RF interference issue.

The remote server device 110, in response to unintentionally generated RF interference, may take action based upon the intentionally generated RF interference, for example, warning vehicle occupants, commanding autonomous vehicles to pull over and stop, and alerting law enforcement authorities.

Figure 3:
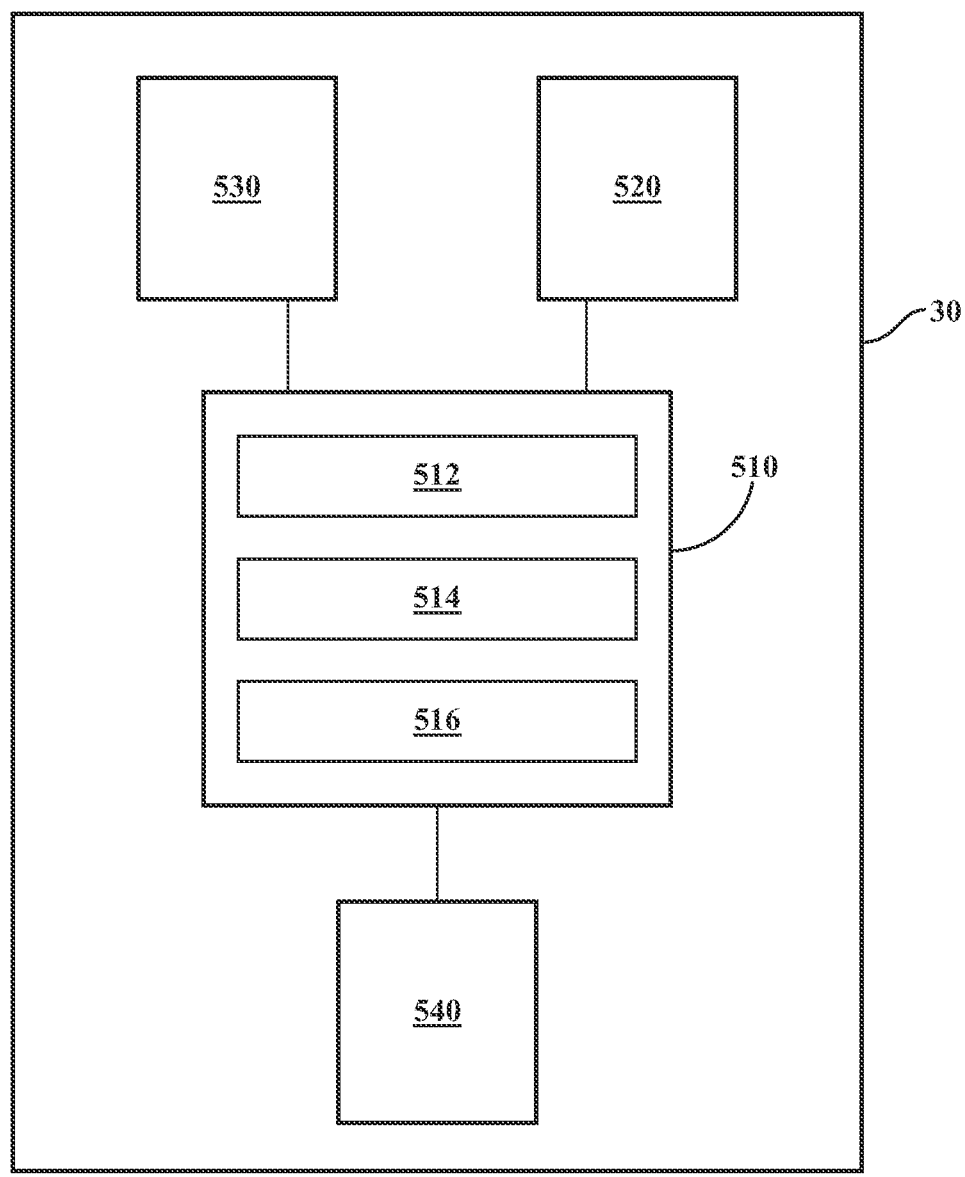
FIG. 3 schematically illustrates the computerized detection and reporting controller of FIG. 1, in accordance with the present disclosure.

FIG. 3 schematically illustrates the computerized detection and reporting controller 30 of FIG. 1. The computerized detection and reporting controller 30 includes processing device 510, communications device 520, data input output device 530, and memory storage device 540. It is noted that computerized detection and reporting controller 30 may include other components and some of the components are not present in some embodiments.

The processing device 510 may include memory, e.g., read only memory (ROM) and random-access memory (RAM), storing processor-executable instructions and one or more processors that execute the processor-executable instructions. In embodiments where the processing device 510 includes two or more processors, the processors may operate in a parallel or distributed manner. Processing device 510 may execute the operating system of the computerized detection and reporting controller 30. Processing device 510 may include one or more modules executing programmed code or computerized processes or methods including executable steps. Illustrated modules may include a single physical device or functionality spanning multiple physical devices. In the illustrative embodiment, the processing device 510 also includes a GNSS signal monitoring module 512, a signal analysis and RF interference diagnostic module 514, and an RF interference reporting module 516, which are described in greater detail below.

The data input output device 530 is a device that is operable to take data gathered from sensors and devices throughout the vehicle and process the data into formats readily usable by processing device 510. Data input output device 530 is further operable to process output from processing device 510 and enable use of that output by other devices or control modules throughout the vehicle.

The communications device 520 may include a communications/data connection with a bus device configured to transfer data to different components of the system and may include one or more wireless transceivers for performing wireless communication.

The memory storage device 540 is a device that stores data generated or received by the computerized detection and reporting controller 30. The memory storage device 540 may include, and is not limited to, a hard disc drive, an optical disc drive, and/or a flash memory drive.

The GNSS signal monitoring module 512 includes programming to monitor signals received through the GNSS receiver 42 of FIG. 1. The GNSS signal monitoring module 512 may monitor the contents of the signals received. The GNSS signal monitoring module 512 may further monitor other factors such as a reference noise level (RNL), a conformity index (CI), a carrier-to-noise ratio (C/NO), an estimate position error, Doppler uncertainties, and pseudorange residuals for the monitored signal. The signal and related information may be saved for further analysis by the signal analysis and RF interference diagnostic module 514.

The signal analysis and RF interference diagnostic module 514 analyzes the signal and the related information monitored by the GNSS signal monitoring module 512. The signal and the related information may each be compared to reference threshold values selected to indicate abnormal signal behavior or likely RF interference conditions. The signal analysis and RF interference diagnostic module 514 may include a binary indication that RF interference is likely to have been detected, or the signal analysis and RF interference diagnostic module 514 may include a scalar indication, rating on some scale (out of one hundred, for example) how strong the RF interference is. The signal analysis and RF interference diagnostic module 514 may make further analyses and determinations, for example, estimating a location of a source of the RF interference based upon changing RF interference signal strengths as the host vehicle moves along a navigational route. Further, the signal analysis and RF interference diagnostic module 514 may estimate a nature of the RF interference, for example, comparing the signal and related information to historical patterns to determine whether the RF interference is likely intentionally created or unintentionally created.

The RF interference reporting module 516 includes programming to report analyses and determinations made by the signal analysis and RF interference diagnostic module 514. The RF interference reporting module 516 may report the information locally to the occupant of the vehicle, to the remote server device 110 of FIG. 2, or to local or federal authorities.

The computerized detection and reporting controller 30 is provided as an exemplary computerized device capable of executing programmed code to accomplish the methods and processes described herein. A number of different embodiments of computerized detection and reporting controller 30, devices attached thereto, and modules operable therein are envisioned, and the disclosure is not intended to be limited to examples provided herein.

Figure 4:
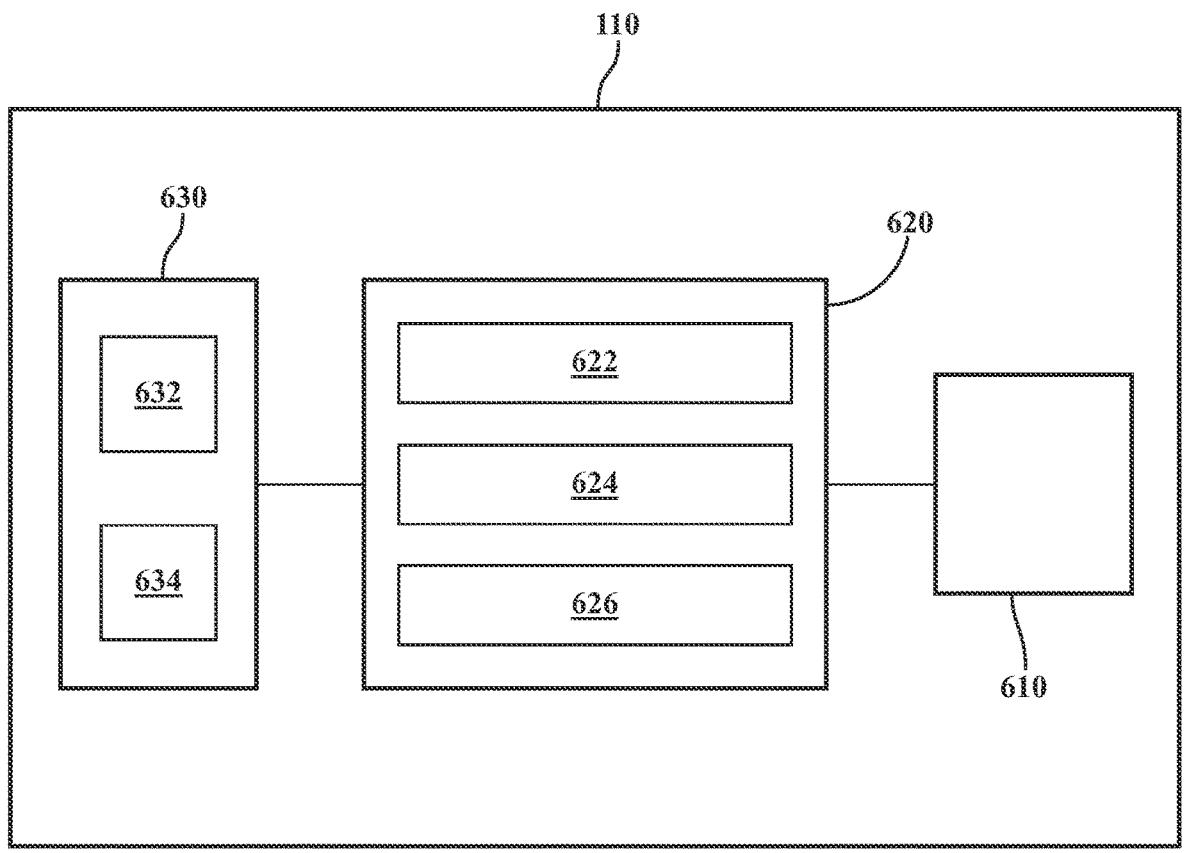
FIG. 4 schematically illustrates the remote server device of FIG. 2, in accordance with the present disclosure.

FIG. 4 schematically illustrates the remote server device 110 of FIG. 2. The remote server device 110 is a computerized device and includes processing device 620, communications device 610, and memory storage device 630. It is noted that remote server device 110 may include other components and some of the components are not present in some embodiments.

The processing device 620 may include memory, e.g., read only memory (ROM) and random-access memory (RAM), storing processor-executable instructions and one or more processors that execute the processor-executable instructions. In embodiments where the processing device 620 includes two or more processors, the processors may operate in a parallel or distributed manner. Processing device 620 may execute the operating system of the remote server device 110. Processing device 620 may include one or more modules executing programmed code or computerized processes or methods including executable steps. Illustrated modules may include a single physical device or functionality spanning multiple physical devices. In the illustrative embodiment, the processing device 620 also includes a reporting vehicle interface module 622, an RF interference diagnostic module 624, and an RF interference reaction module 626, which are described in greater detail below.

The communications device 610 may include a communications/data connection with a bus device configured to transfer data to different components of the system and may include one or more wireless transceivers for performing wireless communication.

The memory storage device 630 is a device that stores data generated or received by the remote server device 110. The memory storage device 630 may include, and is not limited to, a hard disc drive, an optical disc drive, and/or a flash memory drive. The memory storage device 630 may include one or more databases capable of storing data and providing access to stored data. The memory storage device 630 includes a vehicle reporting database 632 storing historical reporting information for a plurality of reporting vehicles and a three-dimensional map database 634 storing map information useful to correlate reports to locations on a map.

The reporting vehicle interface module 622 includes programming to interface with a plurality of reporting vehicles. The reporting vehicle interface module 622 may register vehicles by owner or operator, receive and catalog reports provided by the vehicles, and classify incoming reports by region, magnitude of the RF interference detected, and nature of the RF interference detected.

The RF interference diagnostic module 624 may operate programming to collate and count RF interference reports. If RF interference of a certain magnitude is detected by multiple vehicles in a same region, the RF interference diagnostic module 624 may classify a significant RF interference event for action or review by a supervisor. The RF interference diagnostic module 624 may diagnose or confirm diagnoses made by the vehicles regarding a presence of RF interference and regarding the nature of the interference. The RF interference diagnostic module 624 may analyze a plurality of reports from vehicles and determine that an intentional RF interference event is taking place and determine that authorities need to be contacted. The RF interference diagnostic module 624 may analyze a plurality of reports from vehicles and determine that an area includes too much RF interference for reliable operation of autonomous vehicles, and the RF interference diagnostic module 624 may generate a command that autonomous vehicles are to be routed away from the area or that a manual operation advisory message is to be generated for vehicles that are routed through the area.

The RF interference reaction module 626 includes programming to generate commands and reports regarding detected or estimated RF interference reported by vehicles. The RF interference reaction module 626 may generate messages for occupants of vehicles, may generate commands or messages for persons or devices planning navigational routes for autonomous vehicles, and may generate commands or messages for infrastructure signage, for example, stating on illuminated textual signs that high RF interference has been detected over a span of roadway and that manual operation is recommended. The RF interference reaction module 626 may alert authorities, for example, connecting with and providing messages to a local emergency responder service, warning police that high RF interference has been detected and that action might be recommended.

The remote server device 110 is provided as an exemplary computerized device capable of executing programmed code to accomplish the methods and processes described herein. A number of different embodiments of the remote server device 110, devices attached thereto, and modules operable therein are envisioned, and the disclosure is not intended to be limited to examples provided herein.

Figure 5:
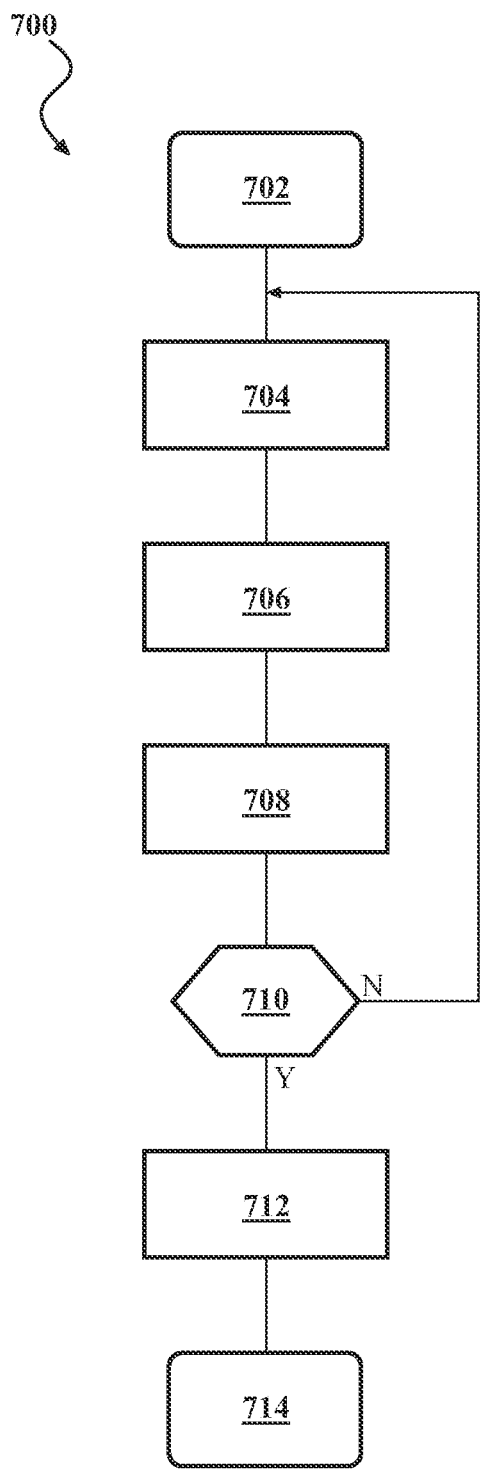
FIG. 5 is a flowchart illustrating a method for detection and reporting of data signal interference operable within a host vehicle, in accordance with the present disclosure.

FIG. 5 is a flowchart illustrating a method 700 for detection and reporting of data signal interference operable within a host vehicle. The method 700 starts at step 702. At step 704, a GNSS signal is received and monitored. At step 706, the GNSS signal is analyzed to determine whether RF interference is present. At step 708, RF interference identified in step 706 is classified according to a magnitude of the RF interference. At step 710, the magnitude of the RF interference is compared to a threshold RF interference level. The threshold may be selected based upon an RF interference level likely to cause problems with operation of the host vehicle. The threshold may include a factor or extra margin, for example, to warn an occupant of the host vehicle prior to the RF interference rising to a level that impedes operation of an exemplary autonomous vehicle navigational system. If the magnitude of the RF interference does not exceed the threshold RF interference level, the method 700 returns to step 704 where the GNSS signal and related RF interference may iteratively be monitored. If the magnitude of the RF interference does exceed the threshold RF interference level, the method 700 advances to step 712 where remedial action, messages, and reporting are performed as disclosed herein based upon the detected or estimated RF interference. At step 714, the method 700 ends. The method 700 is provided as an example. A number of additional and/or alternative method steps are envisioned, and the disclosure is not intended to be limited to the examples provided herein.

Figure 6:
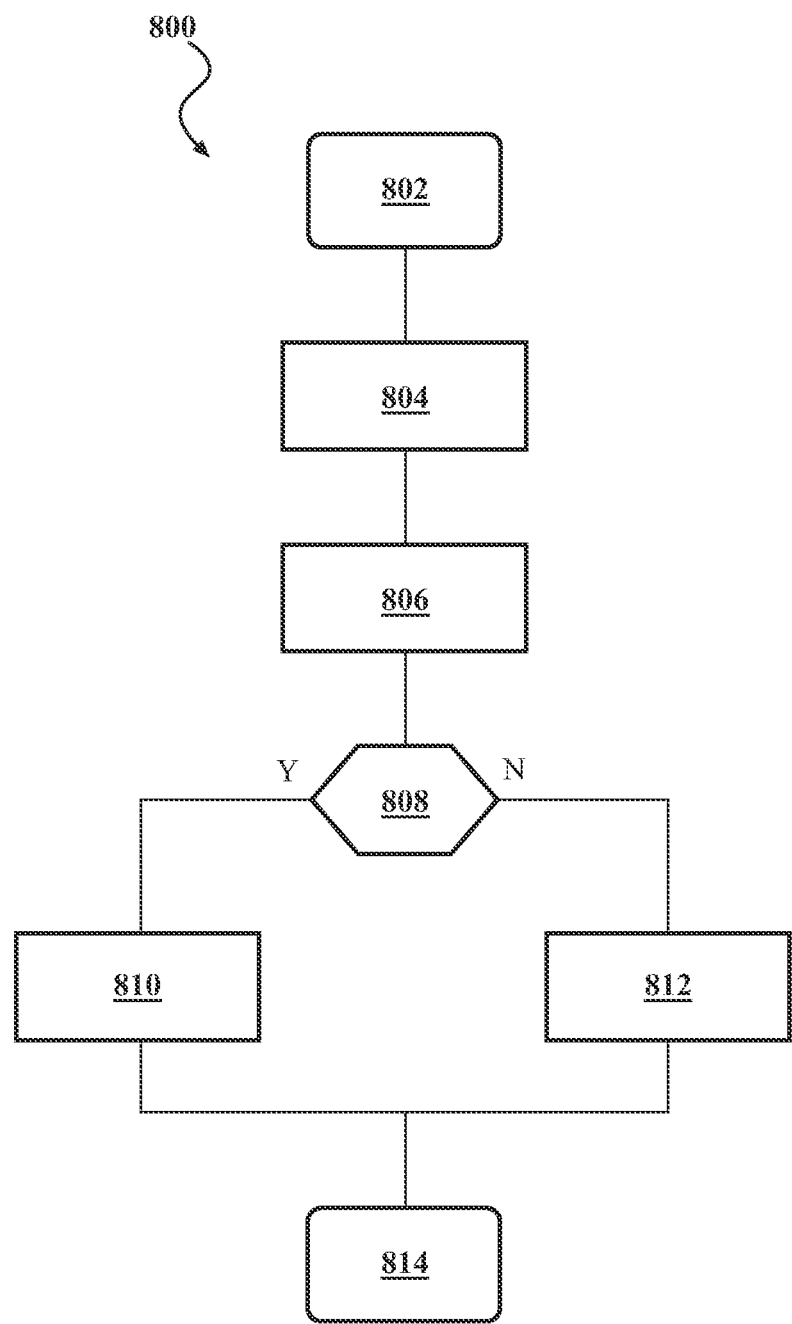
FIG. 6 is a flowchart illustrating a method for detection and reporting of data signal interference through vehicle crowd sourcing, in accordance with the present disclosure.

FIG. 6 is a flowchart illustrating a method 800 for detection and reporting of data signal interference through vehicle crowd sourcing. The method 800 starts at step 802. At step 804, reporting from vehicles detecting RF interference is monitored, classified, and stored by a remote server device. The reporting may be generated according to the method 700 of FIG. 5. At step 806, the remote server device analyzes the monitored reporting to determine magnitudes of RF interference is being reported in a plurality of areas. Step 806 may optionally include a determination whether the determined magnitudes of RF interference for the plurality of areas exceed a threshold RF interference. A single threshold RF interference level may be determined, for example, based upon an RF interference level likely to interfere with operation of vehicles. The threshold RF interference level may include a factor or extra margin, for example, to warn vehicles in one of the plurality of areas prior to the RF interference rising to a level that impedes operation of exemplary autonomous vehicle navigational systems. Area specific threshold RF interference levels may be determined, for example, with an area expected to have chronic RF interference issues including an area specific threshold RF interference level selected to warn when the RF interference in the specific area is higher than a usual amount. At step 808, a determined threshold RF interference event for an area is analyzed to determine whether the RF interference appears to be intentionally created. If the RF interference appears to be intentionally created, the method 800 advances to step 810, where vehicles are commanded and messages are generated based upon an estimated malicious action, for example, commanding autonomous vehicles to stop, recommending occupants assume manual control over vehicles, and contacting local emergency responders. If the RF interference does not appear to be intentionally created, the method 800 advances to step 812, where messages are generated warning occupants of vehicles in the area of high RF interference and navigational routes in a portion of the vehicles that may be rerouted are routed away from the area with the high RF interference. The method 800 ends at step 814. The method 800 is provided as an example. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for detection and reporting of data signal interference through vehicle crowd sourcing, the system comprising:
    a plurality of vehicles, each vehicle including:
        a global navigation satellite system (GNSS) antenna;
        a GNSS receiver electronically connected to and receiving a GNSS data signal though the GNSS antenna;
        a cellular antenna;
        a cellular modem configured for sending and receiving data over a wireless communication network through the cellular antenna;
        a computerized detection and reporting controller including programming to:
            monitor the GNSS data signal;
            analyze the GNSS data signal to identify a presence of radio frequency (RF) interference; and
            generate a report of an RF interference event over the wireless communication network to a remote server device based upon the presence of the RF interference; and
    the remote server device including programming to:
        monitor the report of the RF interference event from each of the plurality of vehicles;
        identify a threshold RF interference event based upon the report of the RF interference event from each of the plurality of vehicles; and
        command a remedial action based upon the threshold RF interference event.

2. The system of claim 1, wherein the remote server device further includes programming to:
    analyze the report of the RF interference event from each of the plurality of vehicles; and
    determine the RF interference event to be an intentional act based upon the analyzing; and
    wherein the remedial action includes notifying authorities of the intentional act.

3. The system of claim 2, wherein the programming to analyze the report of the RF interference event from each of the plurality of vehicles includes comparing a noise reference level and a conformity index with a satellite carrier-to-noise ratio, an estimated position error, pseudorange residuals, and Doppler uncertainties.

4. The system of claim 3, wherein comparing the noise reference level and the conformity index with the satellite carrier-to-noise ratio, the estimated position error, the pseudorange residuals, and the Doppler uncertainties includes determining occurrence of at least one of an immediate reduction in satellite carrier-to-noise ratio levels by at least 5 dB, the estimated position error exceeds 75 meters, an immediate increase in pseudorange residuals by at least 20 meters, or an immediate increase in Doppler uncertainties by at least 10%.

5. The system of claim 1, wherein the remedial action includes providing a message to an occupant in at least one of the plurality of vehicles.

6. The system of claim 5, wherein the message includes:
    notifying the occupant of the RF interference; and
    advising the occupant to take manual control.

7. The system of claim 1, wherein the remedial action includes generating a command for one of the plurality of vehicles to pull over and stop.

8. The system of claim 1, wherein the remedial action includes generating a command in at least one of the plurality of vehicles to adjust a navigational route to avoid effects of the RF interference event.

9. The system of claim 1, wherein the remedial action includes generating a map display illustrating a location of the RF interference event.

10. A method for detection and reporting of data signal interference through vehicle crowd sourcing, the method comprising:
    within each of a plurality of vehicles:
        receiving a GNSS data signal though a GNSS antenna;
        within a computerized processor:
            monitoring the GNSS data signal;
            analyzing the GNSS data signal to identify a presence of radio frequency (RF) interference; and
            generating a report of an RF interference event over a wireless communication network to a remote server device based upon the presence of the RF interference; and
    within the remote server device:
        monitoring the report of the RF interference event from each of the plurality of vehicles;
        identifying a threshold RF interference event based upon the report of the RF interference event from each of the plurality of vehicles; and
        commanding a remedial action based upon the threshold RF interference event.

11. The method of claim 10, further comprising, within the remote server device:
    analyzing the report of the RF interference event from each of the plurality of vehicles; and
    determining the RF interference event to be an intentional act based upon the analyzing; and
    wherein commanding the remedial action includes notifying authorities of the intentional act.

12. The method of claim 11, wherein analyzing the report of the RF interference event from each of the plurality of vehicles includes comparing a noise reference level and a conformity index with a satellite carrier-to-noise ratio, an estimated position error, pseudorange residuals, and Doppler uncertainties.

13. The method of claim 12, wherein comparing the noise reference level and the conformity index with the satellite carrier-to-noise ratio, the estimated position error, the pseudorange residuals, and the Doppler uncertainties includes determining occurrence of at least one of an immediate reduction in satellite carrier-to-noise ratio levels by at least 5 dB, the estimated position error exceeds 75 meters, an immediate increase in pseudorange residuals by at least 20 meters, or an immediate increase in Doppler uncertainties by at least 10%.

14. The method of claim 10, wherein commanding the remedial action includes providing a message to an occupant in at least one of the plurality of vehicles.

15. The method of claim 14, wherein the message includes:
   notifying the occupant of the RF interference; and
   advising the occupant to take manual control.

16. The method of claim 10, wherein commanding the remedial action includes commanding one of the plurality of vehicles to pull over and stop.

17. The method of claim 10, wherein commanding the remedial action includes generating a command in at least one of the plurality of vehicles to adjust a navigational route for to avoid effects of the RF interference event.

18. The method of claim 10, wherein commanding the remedial action includes generating a map display illustrating a location of the RF interference event.

19. A system for detection and reporting of data signal interference through vehicle crowd sourcing, the system comprising:
   a plurality of vehicles, each vehicle including:
      a global navigation satellite system (GNSS) antenna;
      a GNSS receiver electronically connected to and receiving a GNSS data signal though the GNSS antenna;
      a cellular antenna;
      a cellular modem configured for sending and receiving data over a wireless communication network through the cellular antenna;
      a computerized detection and reporting controller including programming to:
         monitor the GNSS data signal;
         analyze the GNSS data signal to identify a presence of radio frequency (RF) interference; and
         generate a report of an RF interference event over the wireless communication network to a remote server device based upon the presence of the RF interference; and
   the remote server device including programming to:
      monitor the report of the RF interference event from each of the plurality of vehicles;
      identify a threshold RF interference event based upon the report of the RF interference event from each of the plurality of vehicles;
      analyze the report of the RF interference event from each of the plurality of vehicles;
      determine the RF interference event to be an intentional act based upon the analyzing; and
      command a remedial action based upon the threshold RF interference event, wherein the remedial action includes notifying authorities of the intentional act; and
   wherein the programming to analyze the report of the RF interference event from each of the plurality of vehicles includes one of comparing a noise reference level and a conformity index with a carrier-to-noise ratio, an estimated position error, pseudorange residuals, or Doppler uncertainties.

* * * * *